May 26, 1959     A. BAYLES     2,888,101
APPLYING SYSTEM FOR DISK BRAKE

Filed April 2, 1956     3 Sheets-Sheet 3

INVENTOR.
ALDEN BAYLES.
BY
John A. Young
ATTORNEY.

2,888,101

APPLYING SYSTEM FOR DISK BRAKE

Alden Bayles, South Bend, Ind., assignor to Bendix Aviation Corporation, South Bend, Ind., a corporation of Delaware Application April 2, 1956, Serial No. 575,455

2 Claims. (Cl. 188—71)

This invention relates to an applying system for disk brakes comprising two independently operated means for actuating the brake.

It is an object of this invention to obtain two distinct and wholly independent means for actuating the brake so that in the event of failure of either means, then the other will be available.

It is a further object of this invention that both operating systems will be substantially equally effective so that failure of the one system will not impair the stopping power of the brake.

It is a further object of the invention to incorporate the two independent applying systems within the same brake carrier so that there is no appreciable increase in size or weight of the brake.

It is a yet further object of the invention to interwork two continuous passages which are formed in the brake carrier so that they communicate with separate fluid motor actuators and do not intersect at any point within the carrier.

Figure 1:
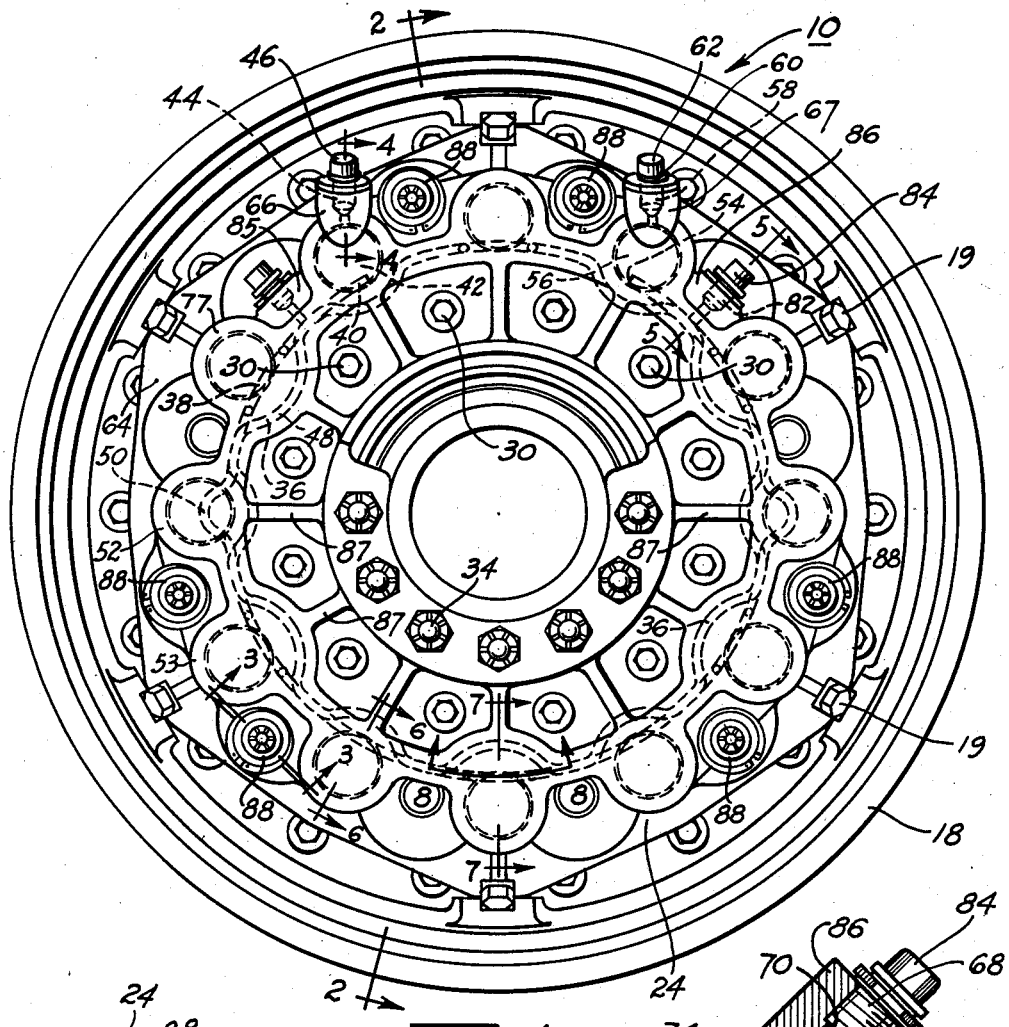
Figure 2:
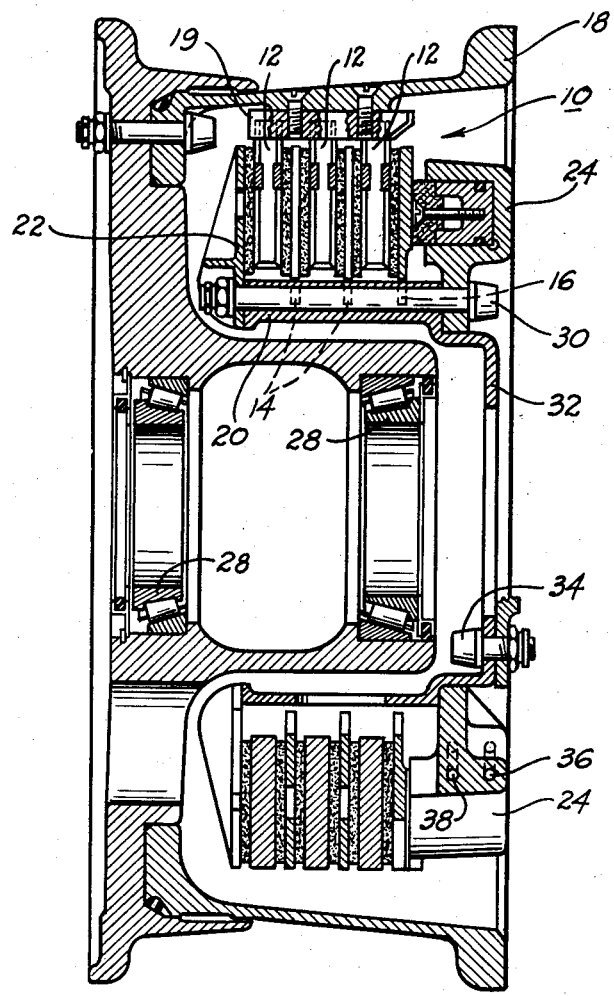
Figure 8:
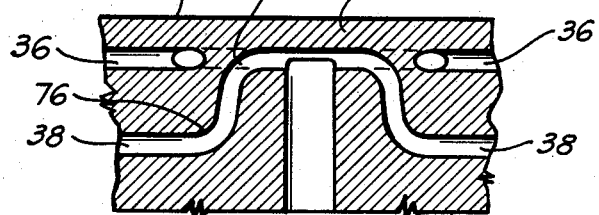
Figure 9:
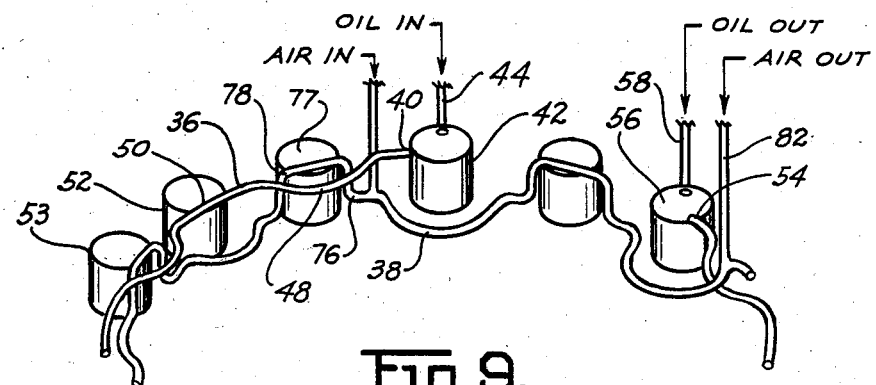

Other objects and features of the invention will become apparent from a consideration of the following description which proceeds with reference to the accompanying drawings, wherein:

Figure 1 is a plan view of the brake having my improved applying system incorporated therein;

Figures 2 through 8 are section views taken respectively on the lines 2—2, 3—3, 4—4, 5—5, 6—6, and 7—7 of Figure 1; and Figure 9 is a partial isometric view of the fluid motor and distributing line arrangement which communicates fluid pressure to the respective fluid motors.

The invention is disclosed in connection with a disk brake which is designated generally by reference numeral 10. The disk brake comprises a plurality of interleaved rotors 12 and stators 14 (one of which is called a pressure plate 16). The rotors are keyed to a rotatable wheel 18 by means of keys 19 which permit axial sliding movement of the rotors. Stators 14 are keyed to a fixed part of the vehicle by means of a number of spaced keys 20 which permit axially slidable movement thereof. At the one side of the brake (Figure 2) is located a reaction plate 22 against which the stack of rotors and stators is forced during brake application, and at the other side of the brake is a fluid motor carrier 24.

The wheel 18 is rotatably supported on an axle or the like by bearings 28. The carrier 24 and reaction plate 22 are fixed to the key 20 by means of a through bolt 30. The key 20 has an integral transverse flange 32 which is secured by bolts 34 to an axle flange which is non-rotatable.

The carrier 24 is formed from a casting having two networks of continuous passages which are formed in the casting. These continuous passages constitute a hydraulic line 36 and a pneumatic line 38. The hydraulic line 36 starts at the point of intersection 40 with cylinder 42. Hydraulic inlet for the system is through a port 44 and passage 45 terminating at cylinder 42 (see Figure 4). A coupling 46 adapts the port for connection with a suitable hydraulic pressure source.

It will be noted in Figures 1 and 9 that there are a number of cylinders which are circumferentially spaced around the carrier approximately equidistant from the center of the carrier. Starting with the piston 42, alternate cylinders are hydraulically applied.

Beginning with cylinder 42, the hydraulic line which conducts fluid pressure to the alternate cylinders, describes an incomplete circular path around the carrier. Tracing the path of the hydraulic line or passage 36, it will be noted that it curves inwardly toward the center of the brake at 48 to avoid the adjacent cylinder and then turns radially outwardly to intersect at point 50 with the base of cylinder 52 to communicate hydraulic fluid pressure thereto. The hydraulic line 36 then curves inwardly to avoid adjacent cylinder 53. This winding movement of the hydraulic line is repeated the rest of the distance around the brake so that alternate cylinders, starting with cylinder 42, are incorporated in the hydraulic fluid system.

The hydraulic line terminates at 54 at the point of intersection with cylinder 56. An outlet passage 58, similar in construction to the inlet passage 45, also intersects the cylinder 56. A bleeder port 60 and bleeder screw 62 is provided in the outlet passage to bleed the hydraulic system.

The hydraulic line 36 remains at the same level in the carrier throughout its length even though it is curved through various arcs to intersect and avoid alternate cylinders. Because the hydraulic line 36 remains in the same plane, and is adjacent the outer face 64 of the carrier, it is possible to construct the inlet boss 66 and bleeder boss 67 integrally with the outer face of the carrier.

Figure 6:
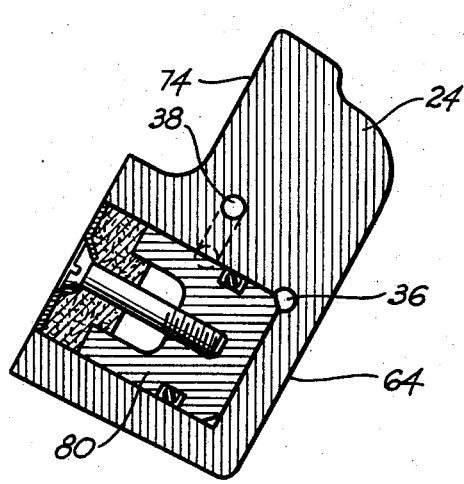
Figure 7:
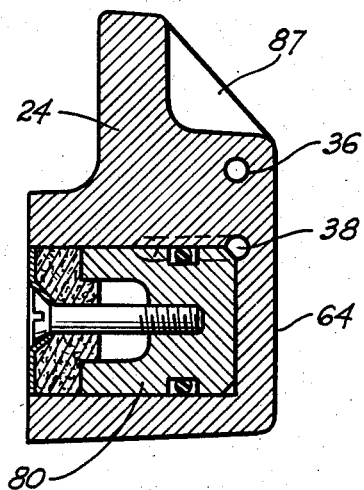

The pneumatic line 38 is also continuous and communicates with alternating cylinders which are bypassed by the hydraulic line. The pneumatic line 38 starts at an inlet port 68 (Figure 5) and thence through passage 70 which intersects the pneumatic line 38. It will be noted that the pneumatic line 38 is located closer to the inner face 74 of the carrier than is the hydraulic line 36 (Figures 5 and 6). The line 38 describes a circular path around the carrier member to communicate with alternate cylinders. As the pneumatic line approaches a cylinder with which it is to communicate, the pneumatic line is turned toward the outer face 64 of the carrier, starting at point 76 (Figures 8 and 9). The pneumatic line attains a new level within the carrier, and at this level it intersects the base of the cylinder 77. The conduit continues along an arcuate path at this new level until point 78 is reached, where it then bends back to its original level within the carrier to there continue its circular path around the carrier. It will be noted from Figure 9 that as the pneumatic line 38 bends toward the outer face 64 of the carrier, to intersect the base of cylinder 77, the hydraulic line 36 curves inwardly at 48 to avoid intersecting with the pneumatic line.

When the pneumatic line 38 reaches piston 52 it curves inwardly around the cylinder 52 in order to lie wholly within the carrier.

The pneumatic line 38 then bends toward the outer face of the carrier to intersect the next adjacent cylinder. The pneumatic line describes a complete circular path around the carrier with portions thereof bending to the outer surface of the carrier to intersect alternating cylinders in the manner described. The pneumatic line 38 terminates in bleed passage 82 having a bleeder screw 84 at the end thereof.

The two lines are thus interwound around the complete carrier member, so that adjacent pistons are alternately pneumatically and hydraulically pressurized to urge pistons 80, which are slidably received therein, in a protractile or applying direction.

It will be noted from Figures 1 and 5 that the inlet boss 85 and outlet boss 86 for the pneumatic line are located along the periphery of the carrier. A number of radial ribs 87 are provided in the carrier to provide strength and rigidity. Three pairs of return springs 88 are also provided to hold the pressure plate 16 in a normally retracted position so that the brake does not develop excessive drag when it is released.

In operation, the hydraulic system is generally the principal applying system. Hydraulic pressure is transmitted from an appropriate source through the inlet port 44 and passage 45 where it communicates with cylinder 42. The hydraulic pressure developed in cylinder 42 is then communicated via hydraulic line 36 to alternating cylinders starting with cylinder 42. The pistons 80 which are slidably received in these alternating pistons, are displaced in a protractile direction to urge the pressure plate 16 in a leftwardly direction (referring to Figure 2), thus clamping the rotors and stators together by thrusting the stack of interleaved rotors and stators against the reaction plate 22.

The hydraulic system is bled through bleeder port 62, when this operation is required.

In the event of malfunctioning of the hydraulic system, then the brake may be pneumatically applied by communicating air pressure to the line 38 via inlet port 68 and inlet passage 70 (Figure 5). The pneumatic line 38 then distributes pneumatic pressure to alternating cylinders which are bypassed by the hydraulic line. The pneumatic line is vented through bleeder port 84. Since the same number of pistons are actuated either pneumatically or hydraulically, the brake is equally effective with both applying systems.

This system of dual operating means, which are wholly independent, gives greater assurance that brakes may always be operated, assuming a complete malfunctioning of either system. This greatly increases the margin of safety in braking.

By locating the two fluid pressure distributing systems wholly within the carrier, possibility of breaking the hydraulic or pneumatic lines is decreased. It has been my experience that exposing the fluid distributing lines to exterior conditions, increases the possibility of their being broken.

Although a single example embodiment has been used for explanation of the invention, it will be appreciated that many modifications may be made thereof. For example, both systems may be either pneumatically or hydraulically applied. The invention is not limited to the combination of a pneumatic and hydraulic fluid pressure medium.

I claim:
1. In a brake, a plurality of axially movable interleaved rotors and stators, an axially movable pressure plate located at one side of the stack of rotors and stators, a fixed reaction member at the other side of the stack of rotors and stators against which the rotors and stators are thrust by said pressure plate, a non-rotatable carrier member located adjacent said pressure plate, a plurality of circumferentially spaced cylinder bores formed in said carrier member which are substantially equidistant from the center of said carrier member, a piston slidably received in each of said cylinder bores and arranged for operative engagement with said pressure plate to exert thrust thereagainst, a hydraulic system for applying a first set of said pistons, said hydraulic system including an inlet port and a continuous hydraulic passage formed in said carrier, said passage describing an incomplete circular path around the brake and intersecting selected cylinder bores at the base thereof, said hydraulic passage being formed to curve radially inwardly to avoid certain of the other cylinder bores, an elevated outlet port for said hydraulic passage located at a level permitting substantially complete purging of air from each of said cylinder bores, a pneumatic applying system for applying said brake independently of said hydraulic system, said pneumatic applying system including a pneumatic passage formed within said carrier and having portions intersecting the cylinder bores not communicated by said hydraulic passage, said pneumatic passage extending in a substantially circular path within said carrier and having other portions axially and radially inward of the first said bore intersecting portions and first said bores of the hydraulic passage, respectively, a sufficient distance to avoid interference therewith and also having interconnecting portions lying radially outwardly of said radially inwardly curved portions of said hydraulic passage a sufficient distance to avoid interference therewith, and an inlet and outlet valve for communicating pressure to said pneumatic passage and venting pressure therefrom.

2. Apparatus of the character described in claim 1 wherein the selected cylinder bores of one system are arranged alternately relative to the bores of the other system.

References Cited in the file of this patent
UNITED STATES PATENTS

| | | |
|---|---|---|
| 2,324,007 | MacPherson | July 13, 1943 |
| 2,611,453 | Vaughn | Sept. 23, 1952 |
| 2,683,504 | Martin | July 13, 1954 |
| 2,730,202 | Du Bois | Jan. 10, 1956 |

FOREIGN PATENTS

| | | |
|---|---|---|
| 1,109,162 | France | Jan. 23, 1956 |